US005199278A

United States Patent [19]

Cocchi

[11] Patent Number: 5,199,278

[45] Date of Patent: Apr. 6, 1993

[54] COMBINED MACHINE FOR PROCESSING PRODUCTS FOR MAKING ICE-CREAM AND CONFECTIONARY

[75] Inventor: Gino Cocchi, Bologna, Italy

[73] Assignee: Carpigiani S.R.L., Italy

[21] Appl. No.: 820,288

[22] Filed: Jan. 3, 1992

[30] Foreign Application Priority Data

Jan. 16, 1991 [IT] Italy ............................ 000018 A/91

[51] Int. Cl.[5] ............................................ A23G 9/12

[52] U.S. Cl. ..................................... 62/343; 366/149; 366/331

[58] Field of Search .................. 62/342, 343; 366/144, 366/149, 331, 41, 150; 403/259

[56] References Cited

U.S. PATENT DOCUMENTS

| | | | |
|---|---|---|---|
| 2,059,604 | 11/1936 | Phelan et al. | 366/331 |
| 2,577,916 | 12/1951 | Rollman | 62/342 X |
| 2,746,730 | 5/1956 | Swenson et al. | 62/343 X |
| 3,170,676 | 2/1965 | Koch | 62/343 X |
| 4,817,396 | 4/1989 | Menzel | 62/342 X |
| 4,917,529 | 4/1990 | Hishida | 403/259 |
| 5,016,446 | 5/1991 | Fiedler | 62/342 |

FOREIGN PATENT DOCUMENTS

| | | | |
|---|---|---|---|
| 852999 | 11/1960 | United Kingdom | 62/343 |

*Primary Examiner*—William E. Tapolcai
*Attorney, Agent, or Firm*—Larson and Taylor

[57] ABSTRACT

A combined machine for processing products for ice cream and confectionery comprising a processing cylinder associated to refrigeration means and heating means which can be operated alternately according to the phases of processing, as well as stirring means which are easily interchangeable so as to permit the processing for pasteurization of various liquid mixtures and for production of ice creams, grated-ice drinks and confectioner's creams in general. Advantageously the machine is provided with an electronic device for controlling and selecting the different processing cycles desired.

9 Claims, 4 Drawing Sheets 17 18 5 16 212 14 114 112 115 7 6 115 15 13 113 15 110 312 10 1 9 8 2

F 4
104
1
15
115
212
312
12
2
6
8

F 4
104
1
15
115
212
312
12'
2
6
8

5
110
10
9
8
2
7
6
1
115
115
15
15
18
17
212
114
112
113
312
16
14
13

COMBINED MACHINE FOR PROCESSING PRODUCTS FOR MAKING ICE-CREAM AND CONFECTIONARY

BACKGROUND OF THE INVENTION

The invention relates to a combined machine for processing products for making ice-cream and confectionery.

In particular, the invention relates to machines with a processing cylinder and associated horizontal-axis stirrer, especially of the so-called batch production type.

Currently, both for the pasteurisation of products for making ice-cream and confectionery, and for the production of ice-cream, of grated-ice drinks and of confectioner's creams in general, it is necessary to resort to different machines for each type of product. For small businesses especially, this represents a great financial expense for the purchase of said machines and creates considerable problems of space.

SUMMARY OF THE INVENTION

It is therefore the main object of the invention to provide a combined machine for processing products for making ice-cream and confectionery, which makes it possible to overcome the abovementioned disadvantages, which has at the same time a simple and rugged construction and the operation of which is efficient and can be easily and quickly controlled by the user.

The invention achieves the above objects by providing a combined machine for processing products for making ice-cream and confectionery, comprising a processing cylinder associated with refrigeration means and heating means which can be activated alternately according to the phases of processing, as well as stirring means which are easily interchangeable so as to permit the processing for pasteurisation of various liquid mixtures and for production of ice-cream, grated-ice drinks and confectioner's creams in general.

The stirrers can be fixed to the operating shaft by virtue of releasable coupling and locking means which are capable of being disengaged manually, and are easy to extract from the processing cylinder, the latter being made fully openable in the region of its open entrance head.

In particular in machines with a horizontal-axis processing cylinder and especially in machines of the batch production type, the entrance head of the processing cylinder is closed in a leakproof manner by a door which is locked in the closed position by releasable means of the bolt type, said door being displaceable into a position of complete opening of the entrance of the processing cylinder.

Advantageously, the machine according to the invention is provided with an electronic device for controlling the various processing cycles, of the type having stored control programs and which is possible also programmable by the user himself, and with a console for control and for selection of the processing programs of the individual products for making ice-cream and confectionery.

The invention also relates to other characteristics which further improve the abovementioned combined machine and which form the object of the subclaims.

BRIEF DESCRIPTION OF THE DRAWINGS

The particular characteristics of the invention and the resultant advantages will be evident in greater detail from the description of a preferred embodiment which is illustrated by way of non-limiting example in the attached drawings, in which.

DESCRIPTION OF THE PREFERRED EMBODIMENT OF THE INVENTION

Figure 1:
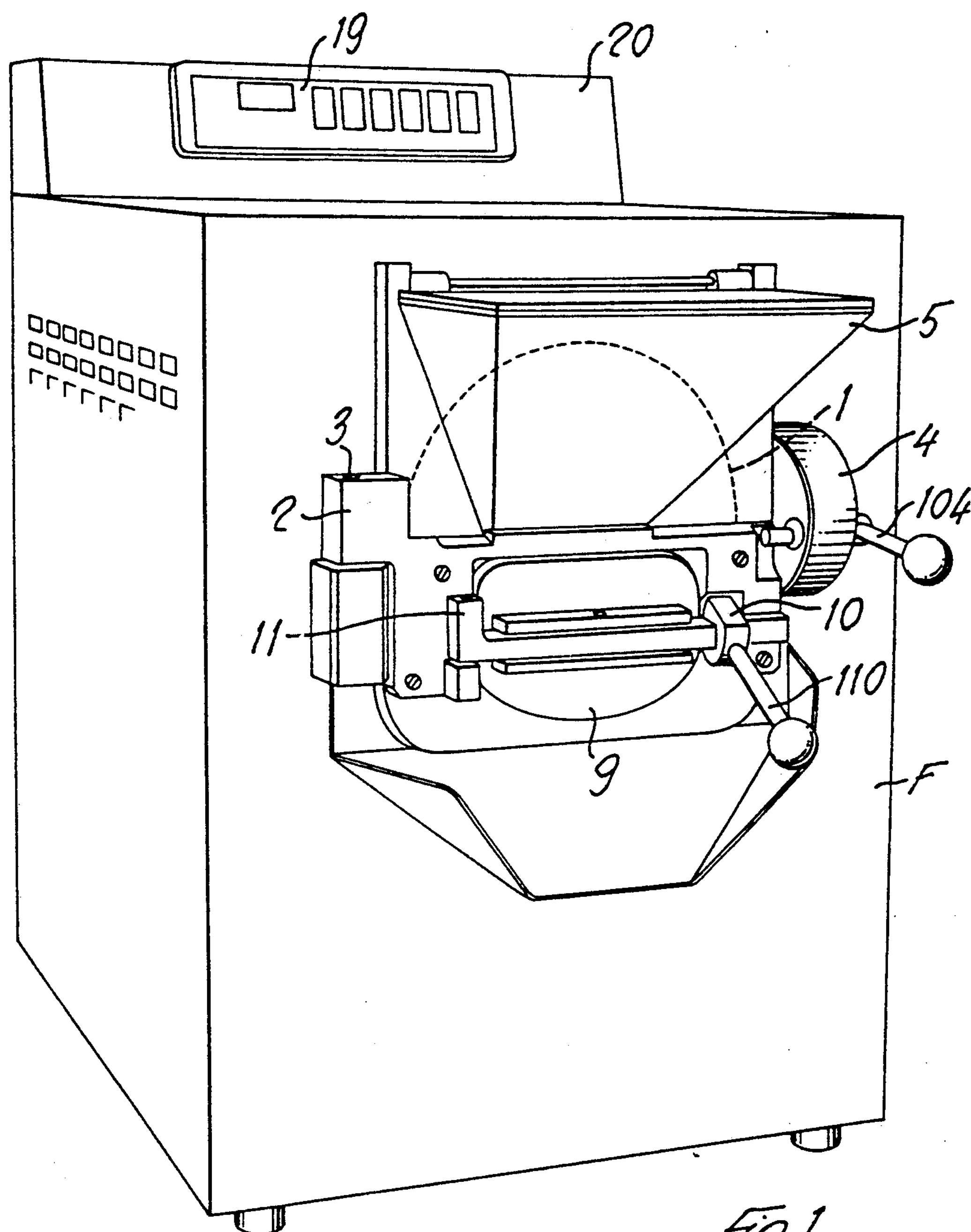
FIG. 1 is a perspective view of a combined machine according to the invention, in particular with a horizontal-axis processing cylinder and of the batch production type.

With reference to the figures, the combined machine for processing products for making ice-cream and confectionery has a processing cylinder 1 which is arranged with its axis in a horizontal position and which is open in the region of the front end F of the machine. The processing cylinder 1 can be closed in a leakproof manner by means of a closing door 2 which is hinged at 3 on the front end F. The closing door 2 can be locked in a releasable manner in the closed position by virtue of a bolt-type locking device 4 which can be operated by means of a lever 104 and which is disposed on the side opposite that of hinging. In the upper part, the door 2 supports a charging hopper 5 which ends in the region of a charging opening 6 for the liquid mixtures to be processed. The charging opening 6 is made in the door 2 and is provided with closing means 7. In its lower part, the door 2 has a discharge opening 8 for the finished product, which can be closed in a leakproof manner by a small door 9 which is hinged on the door 2 at 11 and can be locked in a releasable manner in the closed position by bolt-type locking means 10 provided with a control lever 110.

Figure 2:
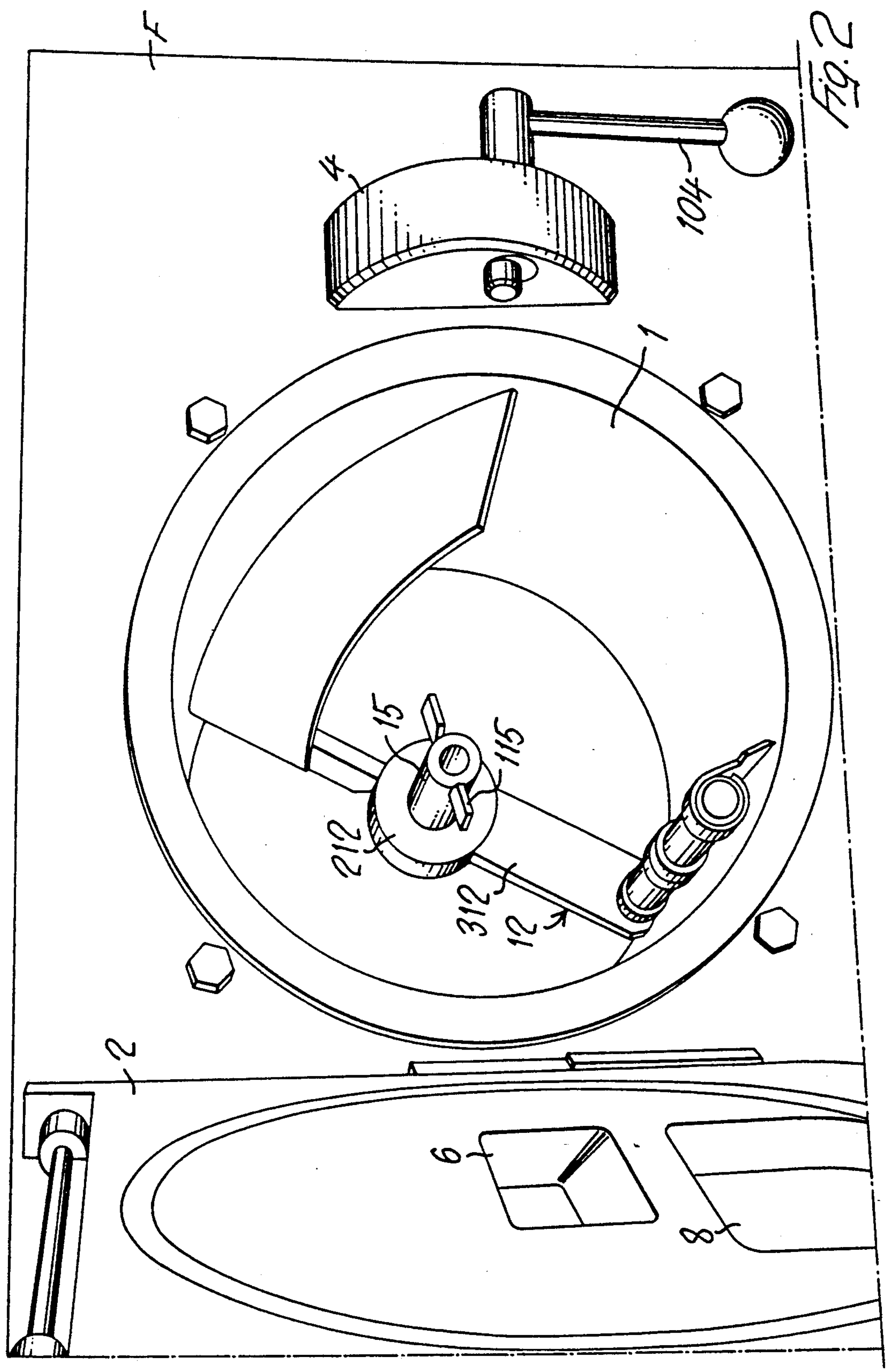
FIG. 2 is a view of the entrance head of the processing cylinder, with the door in its completely open position and with a stirrer of the type suitable for the production of grated-ice drinks.
Figure 3:
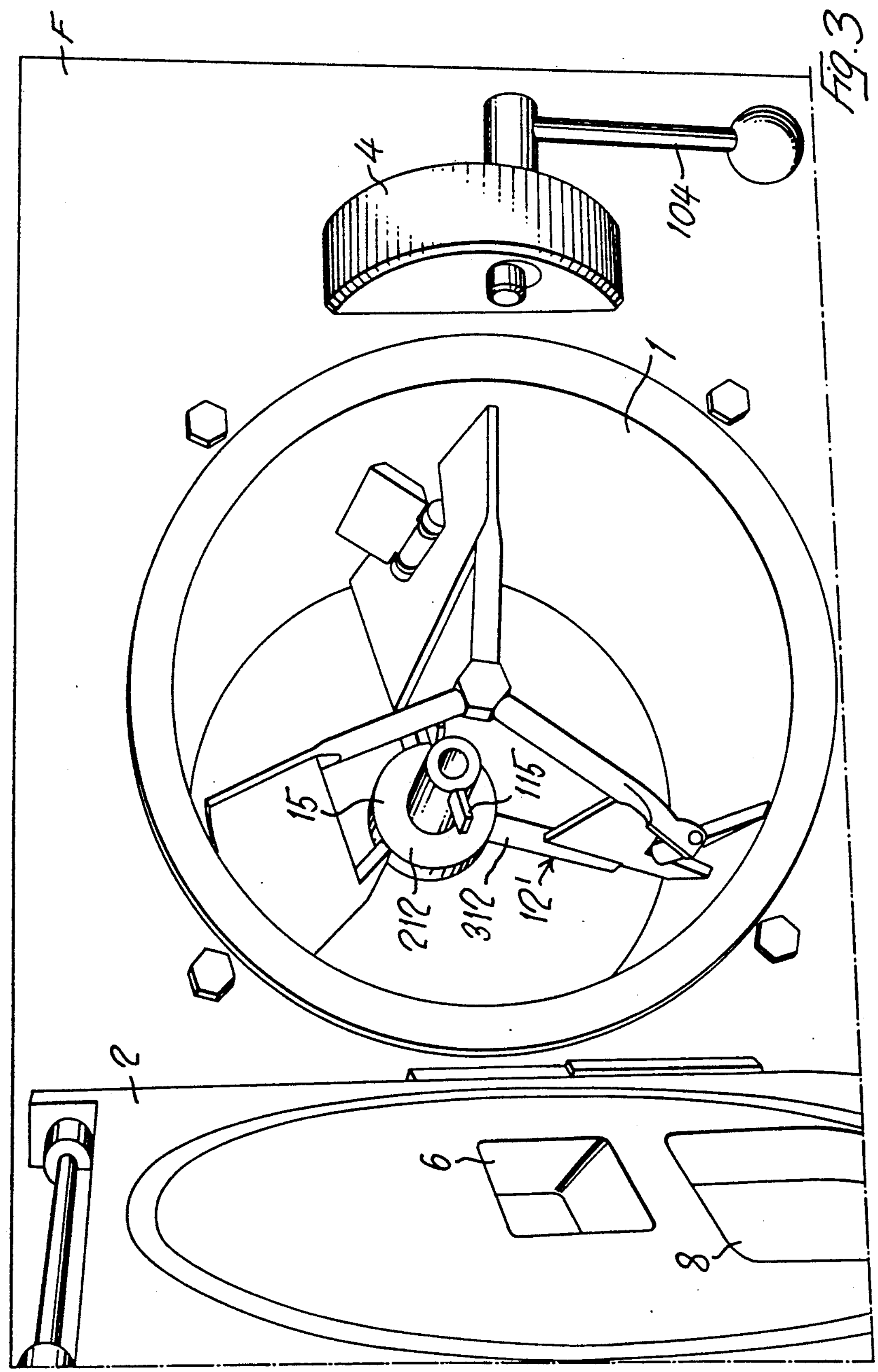
FIG. 3 is a view similar to FIG. 2, in which a stirrer for the production of ice-cream is mounted in the processing cylinder.
Figure 4:
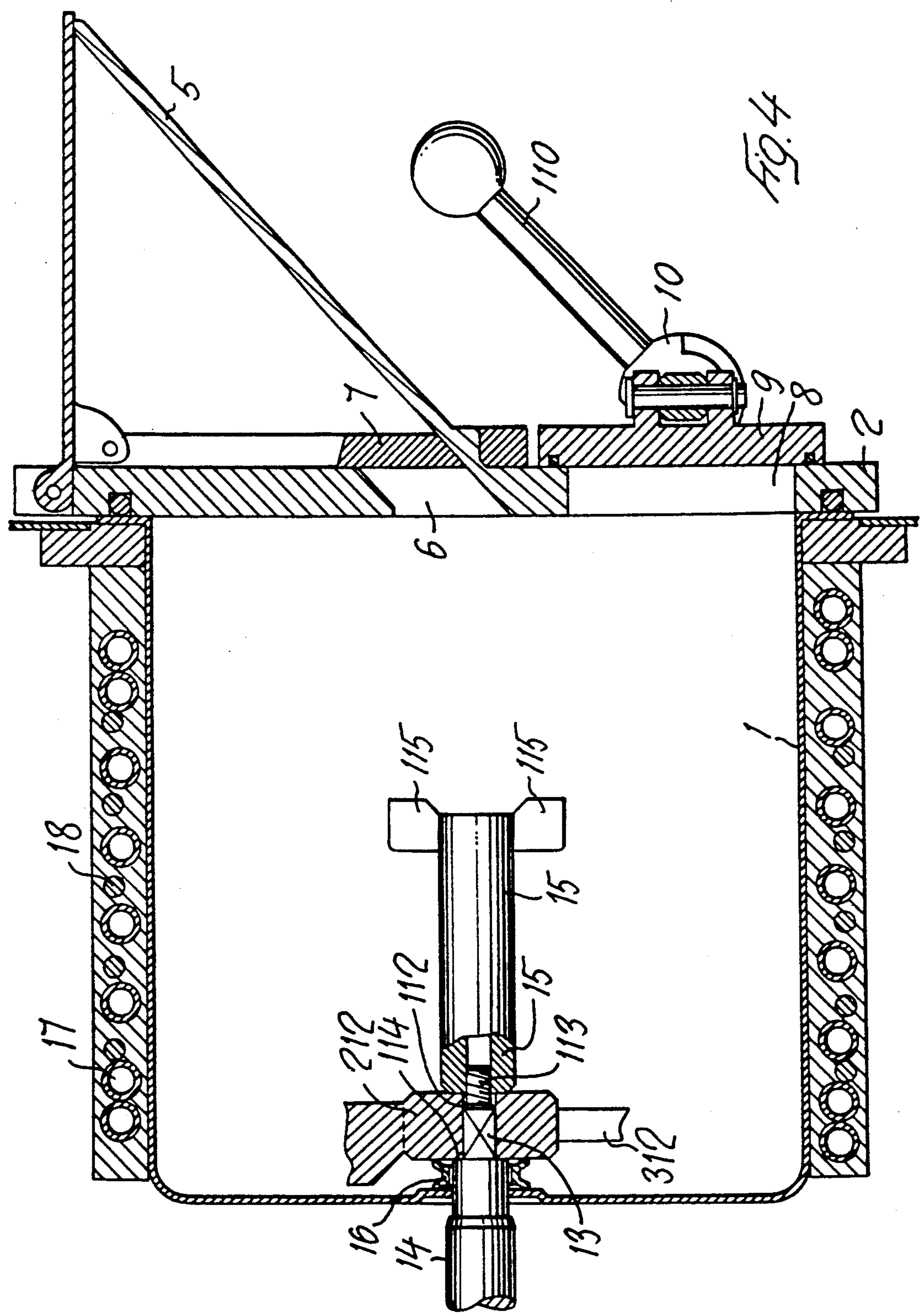
FIG. 4 is an axial cross-sectional view of the processing cylinder according to the preceding figures, with a stirrer of generic type.

As is clear from FIGS. 2 and 3, in the open position of the closing door 2, the front entrance of the processing cylinder 1 is completely open. This makes it possible conveniently to carry out extraction from the processing cylinder 1 of a stirrer 12 and its replacement by a further stirrer 12' suitable for the processing of a different product. By way of example, in FIG. 2, the processing cylinder 1 accommodates a stirrer of the type suitable for the production of grated-ice drinks, which is indicated by 12, while in FIG. 3, the stirrer 12' mounted in the processing cylinder 1 is of the type suitable for the production of ice-cream.

the stirrers 12, 12' are made so as to be easily disassembled from the processing cylinder 1. With particular reference to FIG. 4, each stirrer is provided with a coupling seat 112 which interacts with a coupling element 13 which is integral with the section of operating shaft 14 which projects coaxially on the inside of the processing cylinder 1. The coupling seat 112 of the stirrer consists of a central, non-round through-hole, the coupling element 13 being made of complementary shape so as to prevent relative rotation between the coupling element 13 and the coupling seat 112 of the stirrer 12. The non-round through-hole is made in a rear support plate 212, from which the vane-bearing arms 312 of the stirrer 12 branch off. In coupled position, the holed plate 312 of the stirrer 12 is locked in a releasable manner between a rear shoulder 114 of the operating shaft 14 and a threaded locking bush 15 which can be screwed onto a terminal extension 113 of the coupling element 13, which projects beyond the front side of the plate 212 itself. Between the rear end of the processing cylinder 1 and the support plate 212, there is interposed an annular gasket 16 which is threaded onto the operating shaft 14. The locking bush 15 is provided with radial fins 115 which permit convenient gripping and simple rotation thereof with the aid of only the hands. Thus, with the closing door 2 open, the stirrer 12 can be quickly and easily disengaged from the operating shaft without the use of special tools and then extracted from the processing cylinder 1.

Around the external side of the processing cylinder 1, there extends the evaporator 17 of a refrigeration system, the further structural elements (not illustrated in detail) of which are accommodated in the housing of the machine. In addition to the cooling system, there is associated with the processing cylinder 1 a heating system, the heating resistor or resistors 18 of which also extend in a uniformly distributed manner and interposed between the turns of the evaporator 17 around the cylinder 1. This makes it possible to bring about both pasteurisation processing cycles, in which the processing cylinder is subjected to heating, and processing cycles which require cooling of the processing cylinder, such as the production of ice-cream of the production of grated-ice drinks etc.

According to FIG. 1, the combined machine is provided with a control device, preferably of the electronic type, in particular of the type which is pre-programmed and/or auto-programmable at will by the user. The control programs for the various processing cycles for the production of the various products for making ice-cream and confectionery can be of the type which is stored in the control device and can be selected by the user by virtue of a selector/indicator 19 mounted on a console 20 for controlling the machine. The control programs can have variables which can be set at will by the user, for example the processing times and the relevant temperatures required. The cooling and heating systems, the outputs of the control thermostats and the motor which operates the stirrer 12 are therefore connected to the control device.

According to a particular characteristic of the control system of the machine, the control programs are made so as to permit two different types of stirring cycles both during the cooling cycle and during the heating cycle.

Advantageously, the stirrer is operated intermittently (intermittet stirring), as a result of which variations in speed are not required.

As far as the cooling cycle is concerned, the control program allows the operator to set a temperature, below which operation of the stirrer is prevented so as to allow static cooling of the mixture to be processed.

The invention is of course not limited to the embodiments which have just been described and illustrated, but can be widely varied and modified, above all structurally. Thus, for example, the heating and cooling systems can be of a type suitable for the ambient conditions of use of the machine and above for the requirements dictated by the sources of power available in the place of use. The whole without leaving the guiding principle explained above and claimed below.

I claim:

1. A combined machine for processing products for making ice-cream and confectionery comprising: a processing cylinder provided with an open front end with a closed rear end; door means for closing in an easily openable manner the front end of said cylinder; refrigeration means and heating means in heat-exchange relation with said cylinder; electronic control means for alternately operating said refrigeration and said heating means according to the selected operational phases of processing; stirring means in said cylinder; a power operated shaft extending with one end into the rear end of said cylinder; and coupling means on said shaft end and on said stirring means for positively quickly locking said stirring means to said shaft end in an easily releasable manner so as to permit the quick substitution of said stirring means so as to permit the processing for pasteurisation of various liquid mixtures and the processing for production of ice-creams, grated-ice drinks and confectioner's creams in general, said door mounting means having an opening structure for charging the liquid mixtures to be processed, which opening structure includes a closing means and a charging hopper which are supported by the door means, and further including a discharge opening for the finished product, which discharge opening is closable in a leakproof manner by a releasable means supported by the door means.

2. The combined machine according to claim 1, in which said electronic control means comprises an electronic device for controlling the various processing cycles, to which are connected the refrigeration and heating systems of the processing cylinder, associated thermostats and adjustment members, and a motor which operates the stirring means, said control means being provided with a console for control and for selection of the processing cycles for the different products for making ice-cream and confectionery.

3. The combined machine according to claim 1 in which the said electronic control means is provided with stored control programs which are variable within certain parameters.

4. The combined machine according to claim 1, in which the electronic control means is programmable by the user.

5. The combined machine according to claim 1, in which each stirrer is provided with an identical coupling seat which is capable of engaging in a mutually non-rotational manner on a coupling element of the terminal end of the said operating shaft which projects on the inside of the processing cylinder.

6. The combined machine according to claim 1, in which said stirrers are provided with vane-bearing arms and the coupling seat of said stirrers comprises a coaxial non-round through-hole in a rear support plate of the vane-bearing arms of the stirrer, the coupling element of the said power operating shaft being of a shape complementary to said hole.

7. The combined machine according to claim 1, in which the releasable means of locking the stirrer comprises a threaded locking bush which is provided with radial fins for manual gripping and in screwable onto a threaded terminal extension of the coupling element which, in coupled position, projects externally to the support plate, said support plate being lockable between a shoulder of the operating shaft and said locking bush.

8. The combined machine according to claim 1, said door means comprising a closing door which is hinged in the region of a completely open head end of the processing cylinder, said closing door being openable so as to leave exposed the entire opening of the processing cylinder and said closing door being lockable in the closed position by bolt-type means.

9. The combined machine according to claim 1, in which the stirrer is operable intermittently.

* * * * *